(12) United States Patent
Dirks et al.

(10) Patent No.: US 8,055,395 B1
(45) Date of Patent: Nov. 8, 2011

(54) METHODS AND DEVICES OF AN AIRCRAFT CROSSWIND COMPONENT INDICATING SYSTEM

(75) Inventors: Charles B. Dirks, Swisher, IA (US); Michael J. Krenz, Cedar Rapids, IA (US); Pamela K. Hahn, Cedar Rapids, IA (US); David W. Jennings, Cedar Rapids, IA (US); Tod J. Santel, Robins, IA (US); Robert F. Dancer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 726 days.

(21) Appl. No.: 11/820,940

(22) Filed: Jun. 21, 2007

(51) Int. Cl.
*G06F 19/00* (2011.01)
*G05D 1/12* (2006.01)
*G08G 5/00* (2006.01)
*G01S 13/08* (2006.01)

(52) U.S. Cl. ........... 701/16; 244/183; 340/949; 342/139

(58) Field of Classification Search ............ 701/16, 701/1, 3–11, 14, 17, 18, 23; 340/945–983, 340/995.1–996; 244/3.14, 3.15–3.21, 17.17, 244/76 B, 34 R, 199.1–219, 35 A, 50, 51, 244/53 R, 62–73 C, 75.1, 174–197, 101–108, 244/34 A; 342/2, 26 B, 29–40, 63, 357, 53
See application file for complete search history.

(56) References Cited

U.S. PATENT DOCUMENTS

| | | | | |
|---|---|---|---|---|
| 6,112,141 A * | 8/2000 | Briffe et al. | | 701/14 |
| 6,722,610 B1 * | 4/2004 | Rawdon et al. | | 244/103 W |
| RE38,584 E * | 9/2004 | Robinson | | 340/601 |
| 7,689,326 B2 * | 3/2010 | He | | 701/3 |
| 2003/0222887 A1 * | 12/2003 | Wilkins et al. | | 345/618 |
| 2004/0167685 A1 * | 8/2004 | Ryan et al. | | 701/16 |
| 2005/0261814 A1 * | 11/2005 | Ryan et al. | | 701/16 |
| 2007/0106433 A1 * | 5/2007 | He | | 701/16 |
| 2007/0129857 A1 * | 6/2007 | Fortier | | 701/16 |

* cited by examiner

*Primary Examiner* — James P Trammell
*Assistant Examiner* — Muhammad Shafi
(74) *Attorney, Agent, or Firm* — Daniel M. Barbieri

(57) ABSTRACT

A system for providing crosswind component information to a pilot of an aircraft is disclosed. The system is comprised of a navigation system; datalink system; devices for manual input of data; a crosswind component module consisting of, in part, a processor and database; and an indicating system consisting of, in part, a tactical display unit system of an aircraft. A navigation system may provide flight parameters for measured and intended flight data as inputs. Other data may also be provided from manual input devices and a datalink system as inputs. The processor of the crosswind component module receives the data, retrieves runway direction data, and determines the data of the crosswind components. An indicating system receives the data of the crosswind components and displays this information.

13 Claims, 7 Drawing Sheets

METHODS AND DEVICES OF AN AIRCRAFT CROSSWIND COMPONENT INDICATING SYSTEM

BACKGROUND OF THE INVENTION

1. Field of the Invention

This invention pertains to the field of cockpit indicators or display units that provide information to pilot or flight crew of aircraft. To address the issue of runway incursion on airports, the embodiments herein improve cockpit display units by adding taxi navigation information on the face of a display unit through the use of a novel system, novel devices, and novel methods.

2. Description of the Related Art

Landing an aircraft under crosswind conditions can cause a great amount of stress on a pilot or flight crew. To address aircraft landing operations in the presence of crosswinds, aircraft are certified with a "maximum demonstrated crosswind component." This value is based on the actual testing conducted during certification trials for an aircraft. To achieve this value, engineering test pilots conduct flight tests in varying degrees of crosswind conditions to explore the maximum amount of crosswind the aircraft can safely handle, i.e., the aircraft has demonstrated adequate rudder available to control aircraft alignment and drift over the runway. Once this value is determined from the tests, it is published in the "limits" section of an aircraft performance operating handbook. While not a "limit" per se, the maximum demonstrated crosswind component represents maximum crosswind flight crew.

Pilots and flight crews are very concerned about any existing crosswind landing situation. Although some level of planning may anticipate possible crosswind conditions, predicting crosswind conditions at the moment of landing is not an exact science and subject to change. While crosswind calculations are capable of being performed during flight, it is not always possible. Often, pilots estimate the actual component based on personal experience and the reported wind speed and relative direction. For instance, if the reported wind for a runway is 30 degrees to the right at 25 knots gusting to 30 knots, the pilot knows that the wind is offset so the effect of the crosswind will be less than 25 knots. However, if the crosswind approaches 90 degrees, or perpendicular to the centerline of the runway, then the landing might be difficult or exceed the maximum demonstrated crosswind component stated in the aircraft performance operating handbook.

If the crosswind component could be determined automatically and displayed to the current wind vector during the landing phase of the flight, the pilot would benefit from a much higher degree of situational awareness. Additionally, this could assist the pilot in making go/no-go decisions regarding the landing operation in a high crosswind situation. In other words, safety is enhanced, situational awareness is enhanced, and aircraft efficiency is enhanced.

In response to these concerns, the embodiments herein provide a reference on the pilot's primary display unit of a visual representation of the actual crosswind component computed from data provided by the navigation sub-systems of an aircraft.

BRIEF SUMMARY OF THE INVENTION

A novel system for providing crosswind component information to a pilot of an aircraft is provided herein. Novel devices for providing crosswind component information to the indicating system of an aircraft and crosswind component information to the pilot or flight crew of an aircraft are provided herein. Novel methods for providing crosswind component information to the indicating system of an aircraft and crosswind component information to the pilot or flight crew of an aircraft are provided herein.

In an embodiment, a system for providing crosswind component information to a pilot of an aircraft is comprised of a navigation system; datalink system; devices for manual input of data; a crosswind component module consisting of, in part, a processor and database; and an indicating system consisting of, in part, a tactical display unit system (e.g., a primary, flight director ("PFD"), and head-up display ("HUD") of an aircraft. A navigation system may provide flight parameters for measured and intended flight data, such as aircraft ground track, aircraft ground speed, aircraft true heading, and aircraft true airspeed. Other data, including direction of the runway of intended landing and reported wind conditions at the airport of intended landing, may also be provided from manual input devices and a datalink system. A processor receives the data, retrieves runway direction data, and determines values related to crosswind components. An indicating system receives and displays this information.

In another embodiment, a first runway crosswind component representing a crosswind component referenced to the runway of intended landing, the first value having been determined using measured wind data in reference to the runway of intended landing, is provided to the indicating system for display. In another embodiment, a first runway crosswind component is displayed on a display unit.

In another embodiment, a second runway crosswind component representing a crosswind component referenced to the runway of intended landing, the second value having been determined using reported wind data in reference to the runway of intended landing, is provided to the indicating system for display. In another embodiment, a second runway crosswind component is displayed on a display unit.

In another embodiment, the maximum demonstrated crosswind component may be displayed as a limit line against the first and second crosswind component values.

In another embodiment, the crosswind component indications may be presented alpha-numerically, graphically, or both. In another embodiment, the crosswind component indications are presented in color, depending on whether a normal condition exists, a cautionary condition exists, or a warning condition exists. In another embodiment, the indications may be provided against a backdrop of a synthetic vision image.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
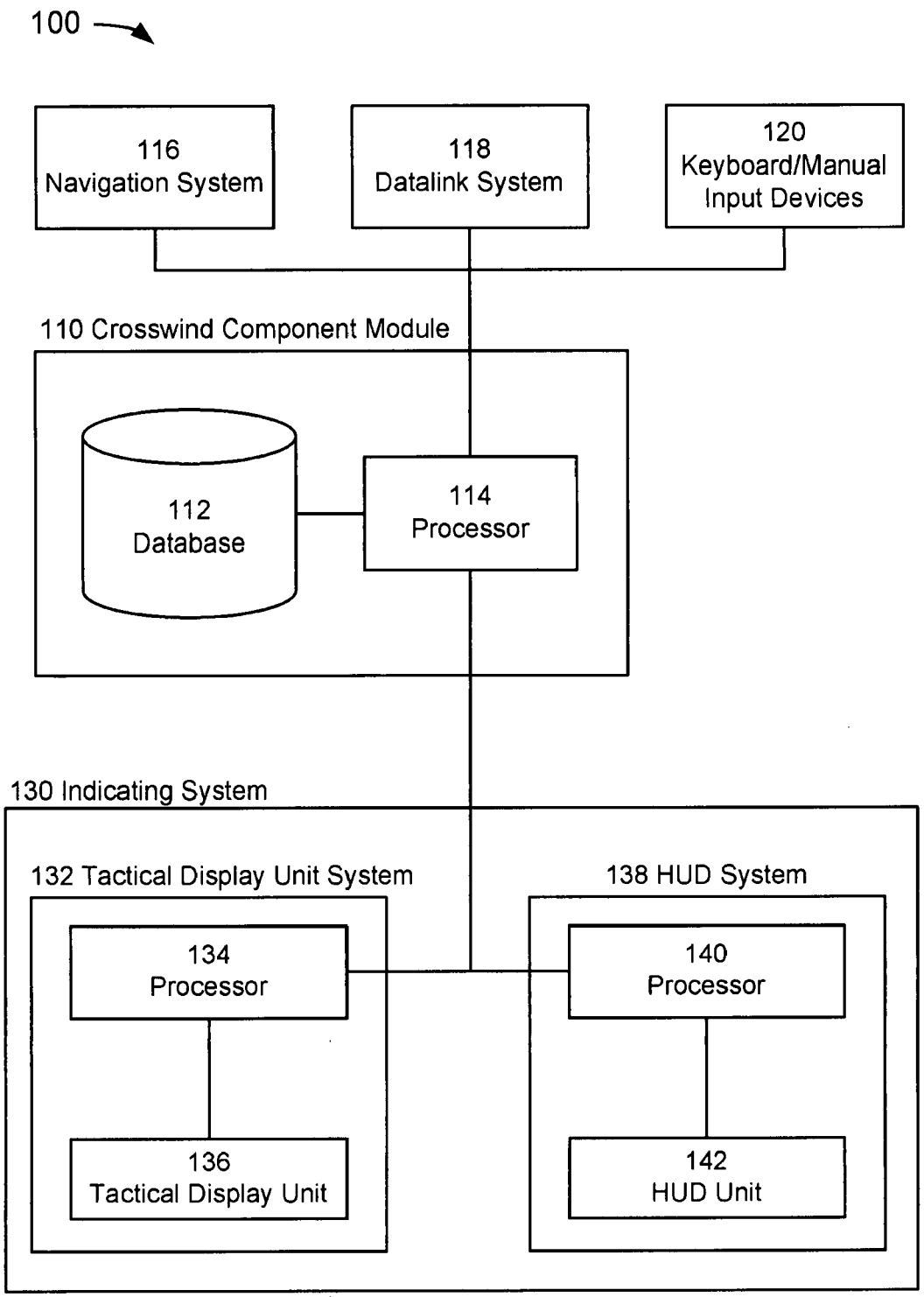
FIG. 1 depicts a block diagram of a crosswind component system.

FIG. 1 depicts a block diagram of a crosswind component system 100 suitable for implementation of the techniques described herein. The crosswind component system 100 of an embodiment of FIG. 1 includes a crosswind component module 110, navigation system 116, datalink system 118, keyboard/manual input devices 120, and an indicating system 130.

The crosswind component module 110 of FIG. 1 includes a database 112 and a processor 114. The database 112 may be comprised of, in part, runway direction data and the maximum demonstrated crosswind component data that is unique to an aircraft. A runway of an airport has a known, fixed direction which could be the magnetic azimuth or direction of the centerline of the runway. Runway direction data may include the direction of a runway or data from which the direction of the runway may be determined. The maximum demonstrated crosswind component data could include the value of the maximum demonstrated crosswind component. This value is based on the actual testing conducted during certification trials for an aircraft. To achieve this value, engineering test pilots conduct flight tests in varying degrees of crosswind conditions to explore the maximum amount of crosswind the aircraft can safely handle, i.e., the aircraft has demonstrated adequate rudder available to control aircraft alignment and drift over the runway. Once this value is determined from the tests, it is published in the "limits" section of an aircraft performance operating handbook. While not a "limit" per se, the maximum demonstrated crosswind component represents maximum crosswind generally accepted by pilots and flight crew.

It should be noted that it is not necessary, for the purposes of the embodiments herein, that a database 112 containing runway directional data be part of the same physical database or storage device containing the maximum demonstrated crosswind component. For example, runway direction data may be stored in one aircraft system and maximum demonstrated crosswind component data in another. In an embodiment of FIG. 1, the runway direction data may be contained in a database included in a flight management computer system of an aircraft. For the purposes of the embodiments herein, database 112 may be any digital memory storage devices or computer-readable media including, but not limited to, RAM, ROM, CD, DVD, hard disk drive, diskette, solid-state memory, PCMCIA or PC Card, secure digital cards, and compact flash cards.

The processor 104 may be an electronic data processing unit. A common example of an electronic data processing unit is a microprocessor; for the embodiments herein, however, the processor is not limited to the microprocessor and its meaning should not be construed narrowly. The processor 114 may be used, in part, to receive measured and intended flight data from a flight navigation system 116 and determine measured wind data at flight altitude which corresponds to the measured and intended flight data. In an embodiment of FIG. 1, the measured and intended flight data could include, but limited to, aircraft ground track, aircraft ground speed, aircraft true heading, and aircraft true airspeed. The navigation system 116 includes those systems that provide navigation data information to the pilot or flight crew. As embodied herein, the navigation system 116 includes, but is not limited to, an air/data system, attitude heading reference system, an inertial guidance system (or inertial reference system), global navigation satellite system (or satellite navigation system), and flight management computing system, all of which are known by those skilled in the art.

The processor 104 may be used, in part, to receive reported wind data at the airport of intended landing and runway of intended landing either from the datalink system 118 and keyboard/manual input devices 120. The datalink system 118 includes those systems that receive data from sources external to the aircraft such as ground stations and satellites. In an embodiment of FIG. 1, an airport weather report containing weather information observed at an airport including wind data could be generated by a ground station and automatically transmitted to the pilot or flight crew of an aircraft via the datalink system 118. The keyboard/manual input devices 120 could allow the pilot or flight crew to enter data manually. In another embodiment of FIG. 1, the pilot or flight crew may listen to a weather report broadcast over a communications radio and manually input weather data including reported wind data via the keyboard/manual input devices 120.

The indicating system 130 includes a tactical display unit system 132 and Head-Up Display ("HUD") system 138. The tactical display unit system 132 includes a processor 134 and tactical display unit 136. The processor 134 may be used, in part, to receive crosswind component data and maximum demonstrated crosswind component data from the crosswind component module 110. In an embodiment of FIG. 1, one or more crosswind component values are provided to the tactical display unit system 132. If this data is formatted according to the specifications of the tactical display unit system 132, the processor 134 could generate and display information on the tactical display unit 136. In another embodiment, one or more crosswind component values are displayed on the tactical display unit 136, values represented in crosswind component data presented on the tactical display unit system 132.

The tactical display unit 136 displays tactical information to the pilot or flight crew—information relevant to the instant or immediate control of the aircraft, whether the aircraft is in flight or on the ground. The tactical display unit 136 displays the same information found on a primary flight display ("PFD") such as basic "T-information" (i.e., airspeed, attitude, altitude, and heading). Although the tactical display unit 136 provides the same information as that of a PFD, it may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit 136 is designed to provide flexible configurations which may be tailored to the desired configuration specified by a buyer or user of the aircraft.

The HUD System 138 is similar to the tactical display unit system 132. The HUD system 138 includes a processor 140 and HUD Unit 142. The processor 140 may be used, in part, to receive crosswind component data and maximum demonstrated crosswind component data from the crosswind component module 110. In an embodiment of FIG. 1, one or more crosswind component values are provided to the HUD system 138. If this data is formatted according to the specifications of the HUD system 138, the processor 140 could generate and display information on the HUD unit 142. In another embodiment, one or more crosswind component values are displayed on the HUD unit 142, values represented in crosswind component data presented on the HUD system 138. The HUD system 138 provides tactical information to the pilot or flight crew on the HUD unit 142.

Figure 2:
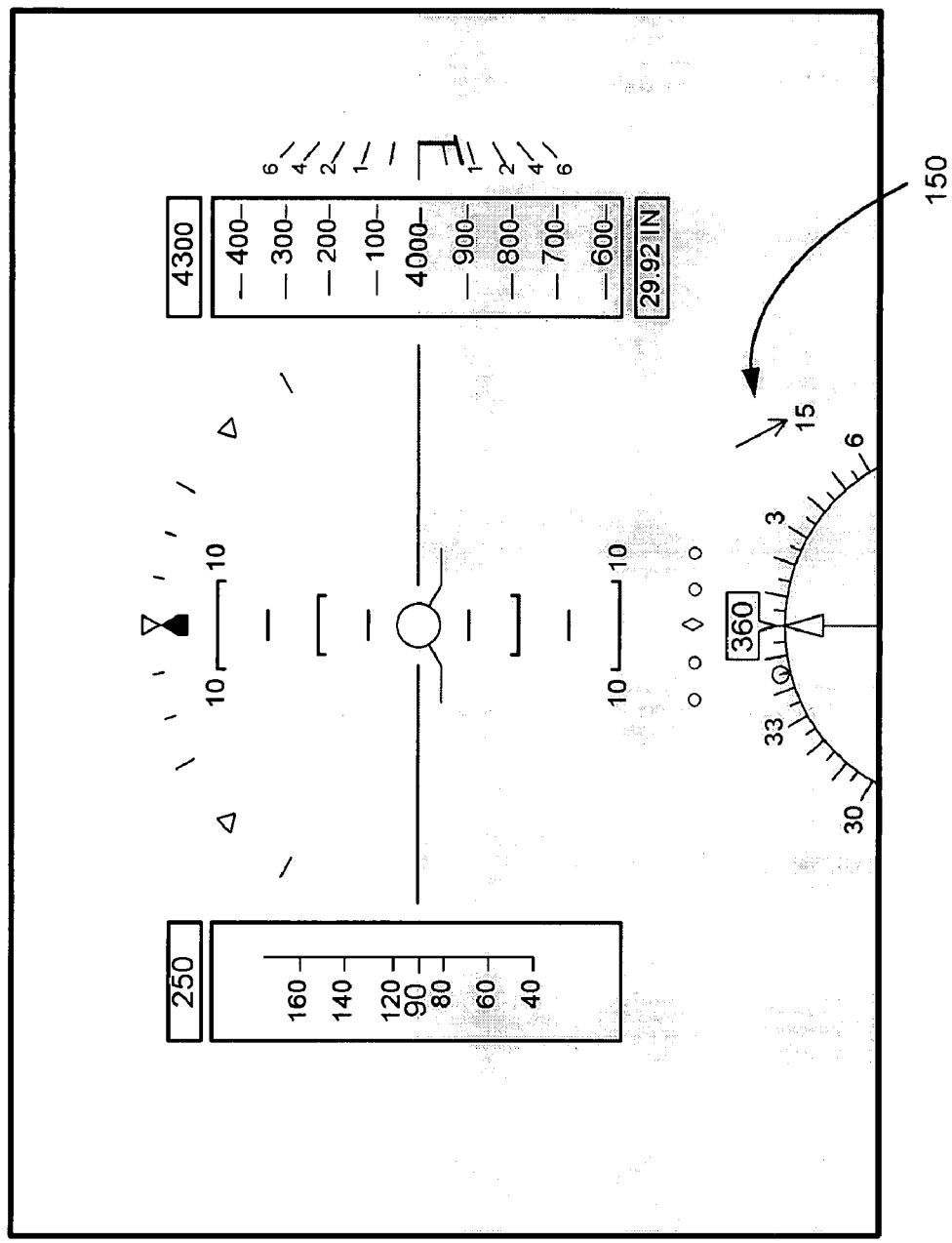
FIG. 2 depicts an exemplary display of a tactical display unit (PFD).

FIG. 2 provides an exemplar depiction of a tactical display unit 136 presenting tactical information to the pilot or flight crew against the backdrop of a blue/brown artificial horizon without the presentation of crosswind component information. It should be noted that the tactical information depicted on the tactical display unit 136 shown in FIG. 2 is minimal for the sake of presentation and not indicative of the plurality of indications or information with which it may be configured. It should also be noted that tactical information presented on a tactical display unit 136 may also be provided to the pilot or flight crew on a HUD unit 142 in the same configuration.

The wind vector 150 graphically depicts values of wind data on a tactical display unit 136. The wind vector 150 identifies the direction and speed from where the wind is coming and points to where the wind is impacting the aircraft. In this illustration, the aircraft is encountering a headwind from the left at a speed of 15 knots at an altitude of 4000 feet. The wind vector 150 display on the tactical display unit 136 may have been received by the tactical display unit system 132 from the navigation system 116 and generated by the processor 134. Because the other tactical indications or information shown on the tactical display unit 136 in FIG. 2 are well-known to those skilled in the art, a discussion of these is not necessary.

Figure 3:
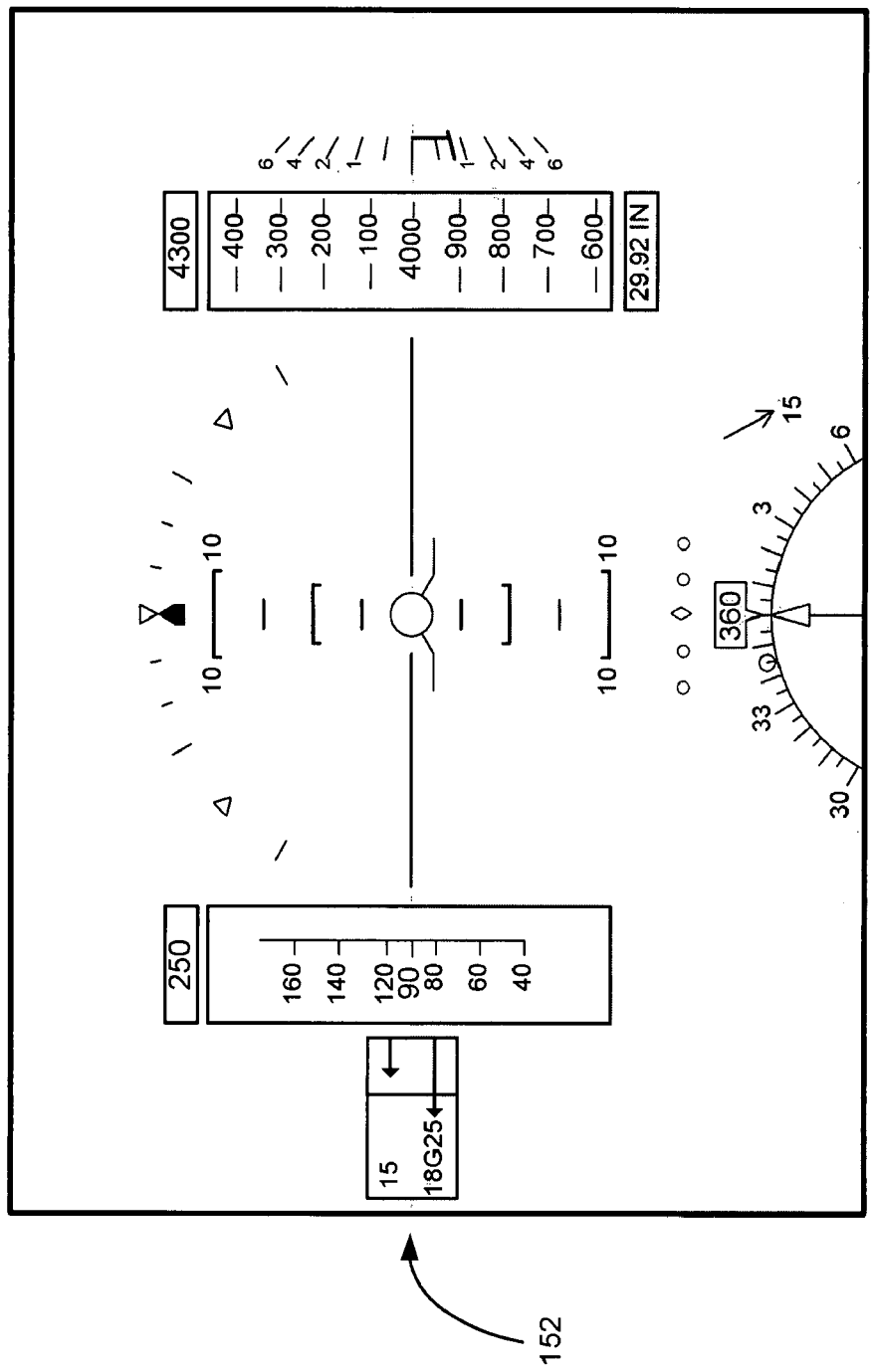
FIG. 3 depicts an exemplary display of a tactical display unit (PFD) of an embodiment herein.
Figure 4:
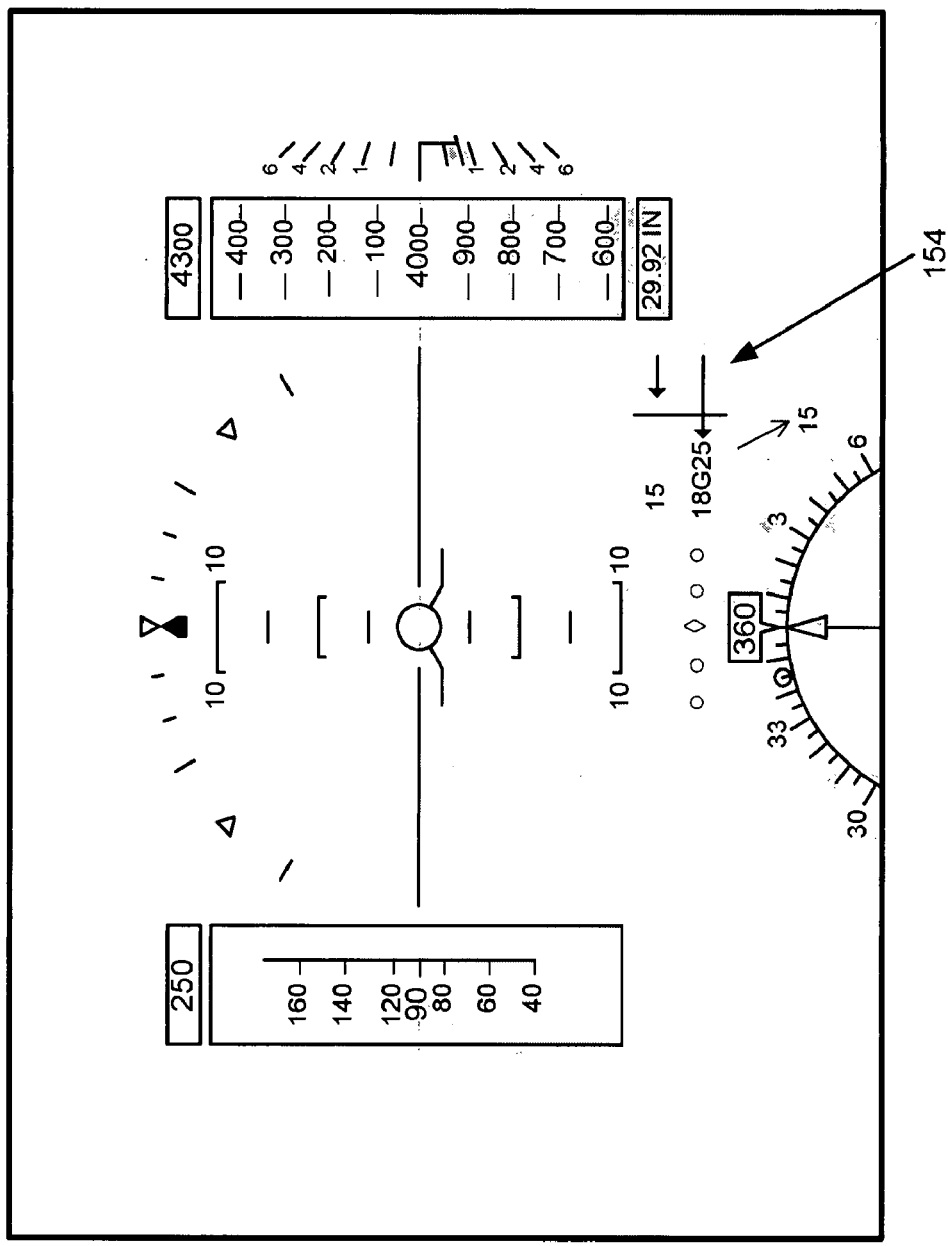
FIG. 4 depicts a second exemplary display of a tactical display unit (PFD) of an embodiment herein.
Figure 5:
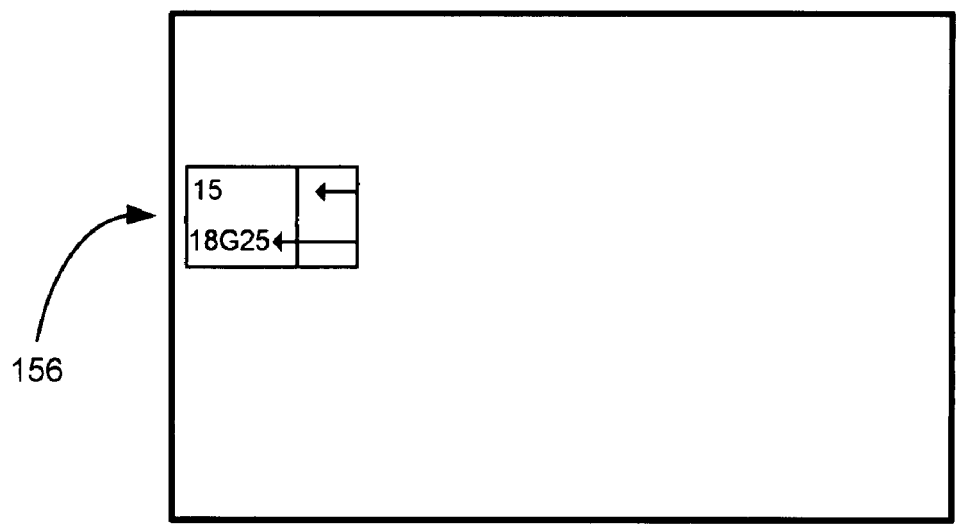
FIG. 5 depicts an exemplary display of a tactical display unit (HUD) of an embodiment herein.

FIG. 3 provides an exemplar depiction of crosswind component indication displayed on a tactical display unit 136, wherein item 152 depicts a crosswind component indicator embodied herein. FIG. 4 provides an exemplar depiction of crosswind component indication 154 displayed in an alternate location on a tactical display unit 136, the location being adjacent to the wind vector 150 (see FIG. 2); as discussed above, the tactical display unit 136 is designed to provide flexible configurations which may be tailored to the desired configuration specified by a buyer or user of the aircraft. FIG. 5 provides an exemplar depiction of crosswind component information displayed on a HUD unit 142, wherein item 156 depicts a crosswind component indication embodied herein. These depictions are presented for the purposes of illustration only and not provided as a limitation. It should be noted that the tactical information depicted on the tactical display unit 136 of FIGS. 3 and 4 and HUD unit 142 of FIG. 5 are intentionally minimal for the sake of presentation and not indicative of the plurality of indications with which it may be configured. As such, the tactical information displayed in FIGS. 3, 4 and 5 should not to be construed as any limitation of the embodiments herein.

It should be noted that the tactical display unit 136 of FIGS. 3 and 4 may depict a blue/brown background which is typically for units displaying an artificial horizon and known to those skilled in the art. In another embodiment, the tactical display unit system 132 could generate and display a background with synthetic imagery on the tactical display unit 136. In an embodiment of FIG. 6A, crosswind component information could be displayed on a tactical display unit 136 providing a synthetic imagery background.

Figure 6A:
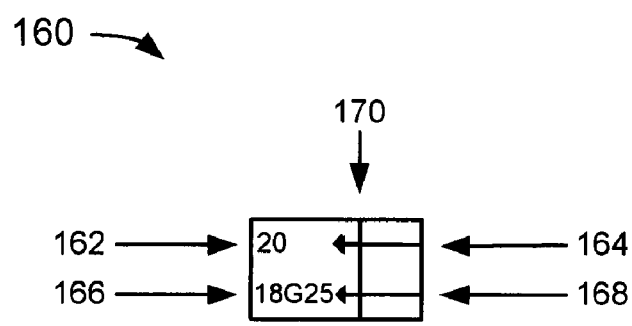
FIG. 6 depicts exemplary displays of crosswind component indications displayed on a tactical display (PFD).

FIG. 6A provides exemplar depictions of the alpha-numeric and graphical indications of the values of the crosswind components displayed on display units and shown in the previous illustrations as items 152, 154, and 156. Items 162 and 164 shown in the upper portion of item 160 depict a first crosswind component value, items 166 and 168 in the lower portion depict a second crosswind component value, and item 170 depicts the maximum demonstrated crosswind component value. It is noted, and it is embodied herein, that the values of each may be depicted alpha-numerically, graphically, or both. In another embodiment, the values may be depicted in different colors. For instance, green could mean normal condition exists, yellow or amber could mean that a caution condition exists, and red could mean that a warning condition exists. In another embodiment, the graphical depiction may be phased, e.g., a phased arrow. In another embodiment, the display may be activated at a pre-selected altitude or phase of flight, e.g., final approach.

Items 162 and 164 depict a first crosswind component value appearing in the upper portion of item 160. The first crosswind component value is determined by the processor 114 of the crosswind component module 110. The processor 114 may receive the data regarding the runway of intended landing and the actual measured wind data of the aircraft in flight. Once the runway of intended landing is received, processor 114 may retrieve the runway heading data from database 112 to determine the magnetic direction of runway. Once the magnetic direction of the runway is known, the processor 114 may then determine the value of the crosswind component data of the measured wind data with reference to the runway of intended landing. It is noted that this determination is not made with reference to the actual heading of the aircraft in flight. The processor 114 may then provide the first crosswind component data representing the value of the first crosswind component to the indicating system 130. The first crosswind component data is then used by processor 134 of the tactical display unit system 132 to generate the display of the first crosswind component value on a tactical display unit 136. In the illustration, although the actual wind condition at the aircraft in flight has not been provided, the display unit indicates the value of the crosswind of the measured wind data in flight with reference to the magnetic direction of the runway and not the aircraft heading in flight: a crosswind from the right (graphically depicted "←" as item 164) at 20 knots (alpha-numerically depicted "20" as item 162). In an embodiment, this indication could be shown in red indicating a warning condition that the first crosswind component value has exceeded the maximum demonstrated component value.

Items 166 and 168 depict the second crosswind component value appearing in the lower portion of item 160. The second crosswind component value is determined by the processor 114 of the crosswind component module 110. The processor 114 may receive the data regarding the runway of intended landing and the reported wind data at the airport of intended landing. Once the runway of intended landing is received, processor 114 may retrieve the runway heading data from database 112 to determine the magnetic direction of runway. Once the magnetic direction of the runway is known, the processor 114 may then determine the value of the crosswind component data of the reported wind data with reference to the runway of intended landing. The processor 114 may then provide the second crosswind component data representing the value of the second crosswind component to the indicating system 130. The second crosswind component data is then used by processor 134 of the tactical display unit system 132 to generate the display of the second crosswind component value on a tactical display unit 136. In the illustration, although the reported wind condition at the airport has not been provided, the crosswind component display indicates the value of the crosswind: a crosswind from the right (graphically depicted "←" as item 168) at 18 knots gusting to 25 knots (alpha-numerically depicted "18G25" as item 166). In an embodiment, the graphical indication could be phased, i.e., gradually and smoothly change length to indicate a gusty wind condition. In another embodiment, this indication could be shown in yellow or amber indicating a caution condition at those times when the second crosswind component does not exceed the maximum demonstrated crosswind component value and in red at those times when the second crosswind component value has exceeded the maximum demonstrated component value.

Item 170 depicts a limit line, i.e., the value of maximum demonstrated crosswind component of the aircraft. The maximum demonstrated crosswind component data is contained in the database 112 of the crosswind component module 110. The processor 114 may retrieve the data from database 112 and provide it to the indicating system 130. The maximum demonstrated crosswind component data is then used by processor 134 of the tactical display unit system 132 to generate the display of the maximum demonstrated crosswind component value on a tactical display unit 136. In the illustration, the maximum demonstrated crosswind component value is 18 knots (graphically depicted the vertical line as item 170). In an embodiment of FIG. 6A, the maximum demonstrated crosswind component value may have an alpha-numeric depiction (not shown in FIG. 6A).

It should be noted that the embodiments of FIG. 6A apply to the HUD system 138 and the HUD unit 142. The absence of discussion with respect to the HUD system 138 and the HUD unit 142 and FIG. 6A should not be construed as limiting. Furthermore, the following discussion regarding the embodiments of FIGS. 6B and 6C also apply to the HUD system 138 and the HUD unit 142.

Figure 6B:
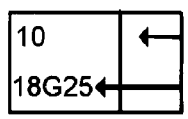
Figure 6C:
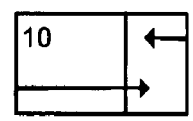

FIGS. 6B and 6C provide other exemplar depictions of the alpha-numeric and graphical indications of the values of the crosswind components displayed on display units as embodied herein. In the illustration of 6B, the actual wind condition of the aircraft in flight indicates a crosswind from the right at 10 knots, and the reported wind condition at the airport indicates a stronger crosswind from the right at 18 knots gusting to 25 knots, and that the limit line of the maximum demonstrated crosswind component is being exceeded under the gusty condition. For an aircraft on a final approach path, the indicator advises the pilot or flight crew to anticipate a stronger crosswind during the descent and that the gusty wind condition would cause the aircraft to exceed maximum demonstrated crosswind component.

In the illustration of 6C, two safety of flight issues are presented: a possible wind shear and a crosswind across the runway of intended landing exceeding the aircraft's maximum demonstrated crosswind component. The actual wind condition of the aircraft in flight indicates a crosswind from the right at 10 knots. However, the reported wind condition at the airport indicates a crosswind from the left. For an aircraft on a final approach path, the indicator advises the pilot or flight crew to anticipate a shift in wind direction, i.e., wind shear. The current, measured crosswind in flight is coming from the right at 10 knots but the reported wind condition at the airport is coming from the left at a speed which the maximum demonstrated crosswind component depicted by the limit line. For an aircraft on a final approach path, the indicator advises the pilot or flight crew to anticipate the crosswind exceeding the limitation of the aircraft performance operating handbook and an unsafe situation.

Figure 7:
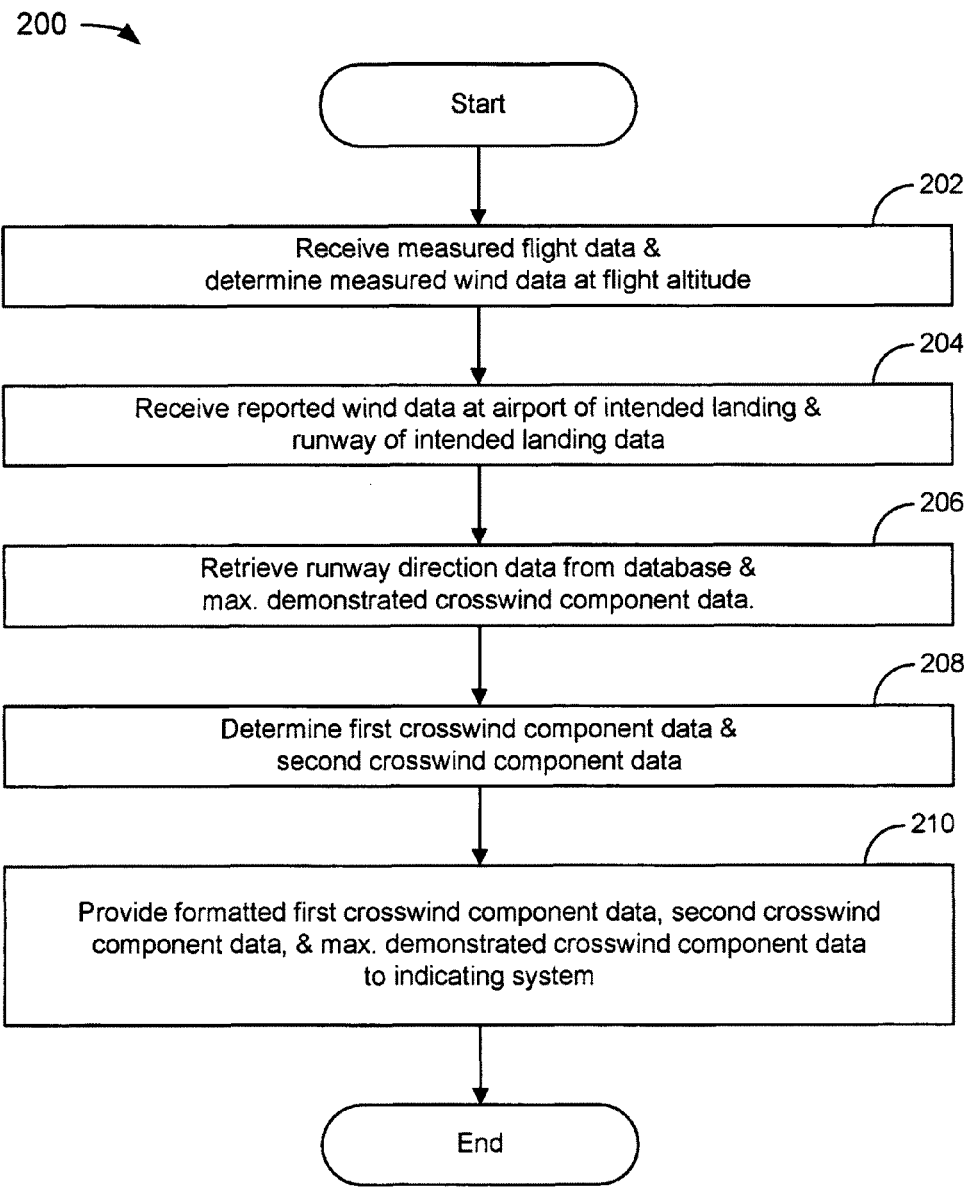
FIG. 7 depicts a flowchart illustrating a method of an embodiment herein.

FIG. 7 depicts flowchart as an example of a method in which crosswind component information could be provided to an indicating system of an aircraft. The flowchart begins with module 202 with the receiving of measured and intended flight data from the aircraft's navigation system. The data received includes aircraft ground track, aircraft ground speed, aircraft true heading, and aircraft true airspeed. This information is used to compute the wind information measured by aircraft sensors in flight, i.e., the current wind condition being currently experienced by the aircraft in flight. The flowchart continues to module 204 with the receiving of reported wind data from the airport of intended landing and the selection of the runway of the intended landing. This information could be received automatically through an aircraft's datalink system 118 or keyboard/manual input device 120. The flowchart continues to module 206 with the retrieval of runway direction data and maximum demonstrated crosswind component data from the database. Runway direction data information could be stored in the database of a flight management system found in aircraft. Maximum demonstrated crosswind component data and value could be contained in any database accessible to the processor 114 of the crosswind component module 110. It is not necessary for the two data to be stored in the same database.

The flowchart continues to module 208 with determination of the first crosswind component data and second crosswind component data. The first crosswind component data is representative of a first value of a crosswind component of the runway of intended landing. Typically, the runway of intended landing has a known, fixed direction which could be the magnetic azimuth or direction of the centerline of the runway. The entry of the runway of intended landing allows the processor to retrieve the magnetic direction of the runway. It is known to those skilled in the art that wind data consists of wind direction and speed. The component of wind data parallel to the direction of the runway may be considered a headwind component, and the component of wind data perpendicular to the direction of the runway may be considered the crosswind component. Thus, the crosswind component has a wind speed value which may be determined through the application of trigonometric functions known to those skilled in the art.

The flowchart continues to module 210 with the providing of the first crosswind component data, the second crosswind component data, and the maximum demonstrated crosswind component data to the indicating system of the aircraft. The indicating system could receive this data and generate an indication on a display unit provided the data is formatted in a manner recognizable to the indicating system. As discussed above, these values may be depicted alpha-numerically, graphically such as a phased or dynamic arrow, or both on the display unit. The crosswind component values could be displayed on the tactical display unit 136, HUD unit 142, or both. Then, the flowchart proceeds to the end.

Figure 8:
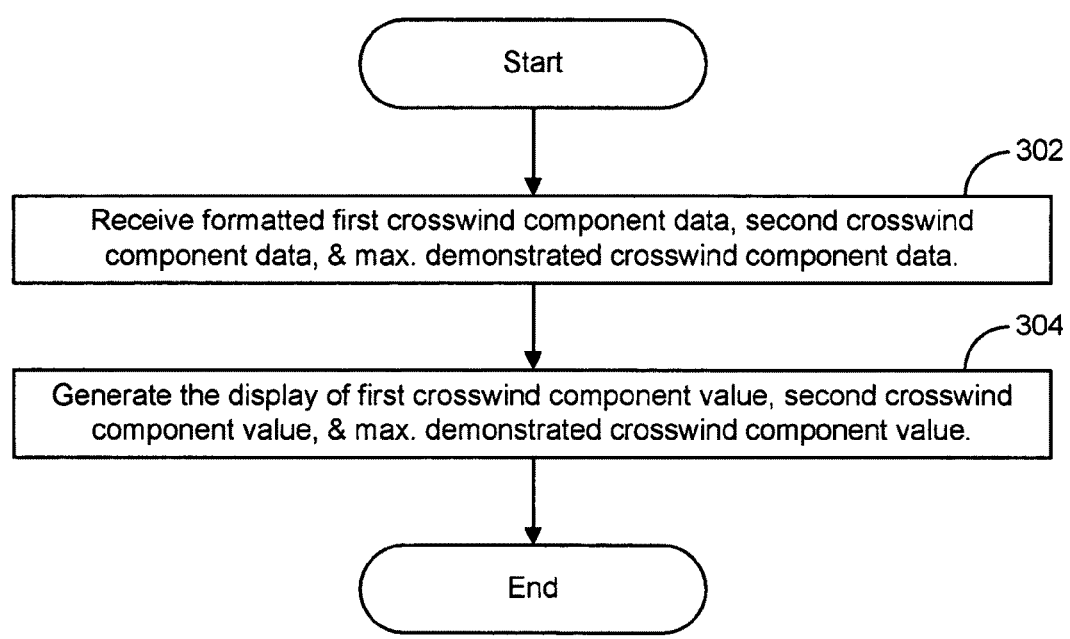
FIG. 8 depicts a flowchart illustrating a second method of an embodiment herein.

FIG. 8 depicts a flowchart 300 as an example of a method in which crosswind component information could be displayed to a pilot or flight crew of an aircraft. The flowchart begins with module 302 with a device of the indicating system 130 receiving maximum demonstrated crosswind component data, a first crosswind component data, and a second crosswind component data. The flowchart continues to module 304 with the generation of the first value of a crosswind component, a second value of a crosswind component on a display of a display unit, and the aircraft's maximum demonstrated crosswind component. As discussed above, these values may be depicted alpha-numerically, graphically such as a phased or dynamic arrow, or both on the display unit. The crosswind component values could be displayed on the tactical display unit 136, HUD unit 142, or both. Then, the flowchart proceeds to the end.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents that fall within the true spirit and scope of the present invention.

What is claimed is:

1. A system for providing crosswind component information to a pilot of an aircraft, the system comprising:
   an aircraft navigation system for providing measured flight data and runway of intended landing data to a crosswind component module;
   the crosswind component module comprising:
      a database comprised of runway direction data of a plurality of runways, and
      a processor programmed to
         receive the measured flight data,
         receive the runway of intended landing data, where such runway of intended landing data is representative of a selection of the runway of intended landing,
         receive airport-reported wind data at the airport of intended landing,
         retrieve runway direction data from the database, where such runway direction data corresponds to the runway of intended landing data and is representative of the magnetic direction of the runway of intended landing,
         determine aircraft-measured wind data at the flight altitude of an aircraft from the measured flight data,
         determine first crosswind component data using the runway direction data and the aircraft-measured wind data, wherein
            the first crosswind component data is representative of the value of the crosswind component of the aircraft-measured wind data, where such crosswind component of the aircraft-measured wind data is referenced to the magnetic direction of the runway of intended landing,
         determine second crosswind component data using the runway direction data and the airport-reported wind data, wherein
            the second crosswind component data is representative of the value of the crosswind component of the airport-reported wind data, where such crosswind component of the airport-reported wind data is referenced to the magnetic direction of the runway of intended landing, and
         provide the first crosswind component data and the second crosswind component data to an aircraft indicating system; and
      the aircraft indicating system configured to
         receive the first crosswind component data and the second crosswind component data, whereby
            the values represented in the first crosswind component data and the second crosswind component data are displayed simultaneously on at least one display unit.

2. The system of claim 1, wherein the measured flight data includes aircraft ground track, aircraft ground speed, aircraft true heading, and aircraft true airspeed.

3. The system of claim 1, wherein the runway of intended landing data is received through a manual input device or datalink system.

4. The system of claim 1, wherein the values represented in the first crosswind component data and the second crosswind component data are displayed alpha-numerically, graphically, or both.

5. The system of claim 1, wherein the reported wind data is received through a manual input device or datalink system.

6. The system of claim 1, wherein
   the processor is further programmed to
      retrieve maximum demonstrated crosswind component data representative of the value of the maximum demonstrated crosswind component of the aircraft, and
      provide the maximum demonstrated crosswind component data to the aircraft indicating system; and
   the aircraft indicating system is further configured to
      receive the maximum demonstrated crosswind component data, whereby
         the value represented in the maximum demonstrated crosswind component data is displayed simultaneously with the values represented in the first crosswind component data and the second crosswind component data.

7. A device for providing crosswind component information to an indicating system of an aircraft, the device comprising:
   an input communications interface electronically coupled to an aircraft navigation system to facilitate the providing of measured flight data and runway of intended landing data to a processor;
   a database comprised of runway direction data of a plurality of runways;
   the processor programmed to
      receive the measured flight data,
      receive the runway of intended landing data, where such runway of intended landing data is representative of a selection of the runway of intended landing,
      receive airport-reported wind data at the airport of intended landing,
      retrieve runway direction data from the database, where such runway direction data corresponds to the runway of intended landing data and is representative of the magnetic direction of the runway of intended landing,
      determine aircraft-measured wind data at the flight altitude of an aircraft from the measured flight data,
      determine first crosswind component data using the runway direction data and the aircraft-measured wind data, wherein
         the first crosswind component data is representative of the value of the crosswind component of the aircraft-measured wind data, where such crosswind component of the aircraft-measured wind data is referenced to the magnetic direction of the runway of intended landing,
      determine second crosswind component data using the runway direction data and the airport-reported wind data, wherein
         the second crosswind component data is representative of the value of the crosswind component of the airport-reported wind data, where such crosswind component of the airport-reported wind data is referenced to the magnetic direction of the runway of intended landing, and
      provide the first crosswind component data and the second crosswind component data to an aircraft indicating system; and
   an output communications interface electronically coupled to the aircraft indicating system to facilitate the receiving of the first crosswind component data and the second crosswind component data by the aircraft indicating system, whereby the values represented in the first crosswind component data and the second crosswind component data are displayed simultaneously on at least one display unit.

8. The device of claim 7, wherein the measured flight data includes aircraft ground track, aircraft ground speed, aircraft true heading, and aircraft true airspeed.

9. The device of claim 7, wherein the runway of intended landing data is received through a manual input device or datalink system.

10. The device of claim 7, wherein the reported wind data is received through a manual input device or datalink system.

11. The device of claim 7, wherein the values represented in the first crosswind component data and the second crosswind component data are displayed alpha-numerically, graphically, or both.

12. The device of claim 7, wherein the values represented in the first crosswind component data and the second crosswind component data are displayed in color.

13. The device of claim 7, wherein the processor is further programmed to
retrieve maximum demonstrated crosswind component data representative of the value of the maximum demonstrated crosswind component of the aircraft, and
provide the maximum demonstrated crosswind component data to the aircraft indicating system; and the output communications facilitates the receiving of the maximum demonstrated crosswind component data by the aircraft indicating system, whereby the value represented in the maximum demonstrated crosswind component data is displayed simultaneously with the values represented in the first crosswind component data and the second crosswind component data.

* * * * *